United States Patent
Schwendemann

(10) Patent No.: US 7,882,759 B2
(45) Date of Patent: Feb. 8, 2011

(54) GEAR DRIVE UNIT

(75) Inventor: Franz Schwendemann, Ottersweier (DE)

(73) Assignee: Robert Bosch GmbH, Stuttgart (DE)

( * ) Notice: Subject to any disclaimer, the term of this patent is extended or adjusted under 35 U.S.C. 154(b) by 690 days.

(21) Appl. No.: 10/581,067

(22) PCT Filed: Jan. 20, 2005

(86) PCT No.: PCT/EP2005/050233

§ 371 (c)(1),
(2), (4) Date: May 31, 2006

(87) PCT Pub. No.: WO2005/081382

PCT Pub. Date: Sep. 1, 2005

(65) Prior Publication Data

US 2007/0137351 A1    Jun. 21, 2007

(30) Foreign Application Priority Data

Feb. 17, 2004 (DE) ............ 10 2004 007 873
Mar. 12, 2004 (DE) ............ 10 2004 012 077

(51) Int. Cl.
*F16H 1/16* (2006.01)
(52) U.S. Cl. ............... 74/425; 74/89.14
(58) Field of Classification Search ............... 74/425, 74/89.14, 409, 410; 310/83, 90, 75 R; 384/610, 384/245
See application file for complete search history.

(56) References Cited

U.S. PATENT DOCUMENTS

| | | | | |
|---|---|---|---|---|
| 405,559 | A * | 6/1889 | Johansson | 384/606 |
| 2,781,191 | A * | 2/1957 | Pickles | 49/139 |
| 2,932,975 | A * | 4/1960 | Racz | 74/86 |
| 2,987,349 | A * | 6/1961 | Kretzmer, Jr. | 384/215 |
| 4,318,573 | A | 3/1982 | Hamman | |
| 4,362,562 | A | 12/1982 | Plessers | |
| 4,586,219 | A | 5/1986 | Blach et al. | |
| 4,652,781 | A * | 3/1987 | Andrei-Alexandru et al. | 310/83 |
| 6,486,577 | B1 * | 11/2002 | Ursel et al. | 310/51 |
| 7,143,845 | B2 * | 12/2006 | Leppanen | 175/162 |
| 2003/0048969 | A1 * | 3/2003 | Hunter et al. | 384/610 |
| 2003/0172761 | A1 | 9/2003 | Marcel | |

FOREIGN PATENT DOCUMENTS

| | | |
|---|---|---|
| DE | 297 02 525 | 7/1998 |
| FR | 2 050 196 | 4/1971 |
| JP | 53-150356 | 11/1978 |
| JP | 56-145351 | 11/1981 |
| JP | 58-128548 | 8/1983 |
| JP | 04058067 | 2/1992 |
| JP | 07015913 | 1/1995 |
| JP | 09215308 | 8/1997 |

* cited by examiner

Primary Examiner—Richard W Ridley
Assistant Examiner—Terence Boes
(74) Attorney, Agent, or Firm—Michael J. Striker

(57) ABSTRACT

In a gear drive unit (10), in particular for adjusting moving parts in the motor vehicle, having a rotor shaft (18) supported in a housing (16) and braced axially on the housing (16) via at least one face end (50) and in which a separate toothed element (32) for transmitting torque to a gear component (38, 40) is secured to the rotor shaft (18), the toothed element (32) has an axial bearing face (48) that rests on one of the face ends (50) of the rotor shaft (18).

7 Claims, 1 Drawing Sheet

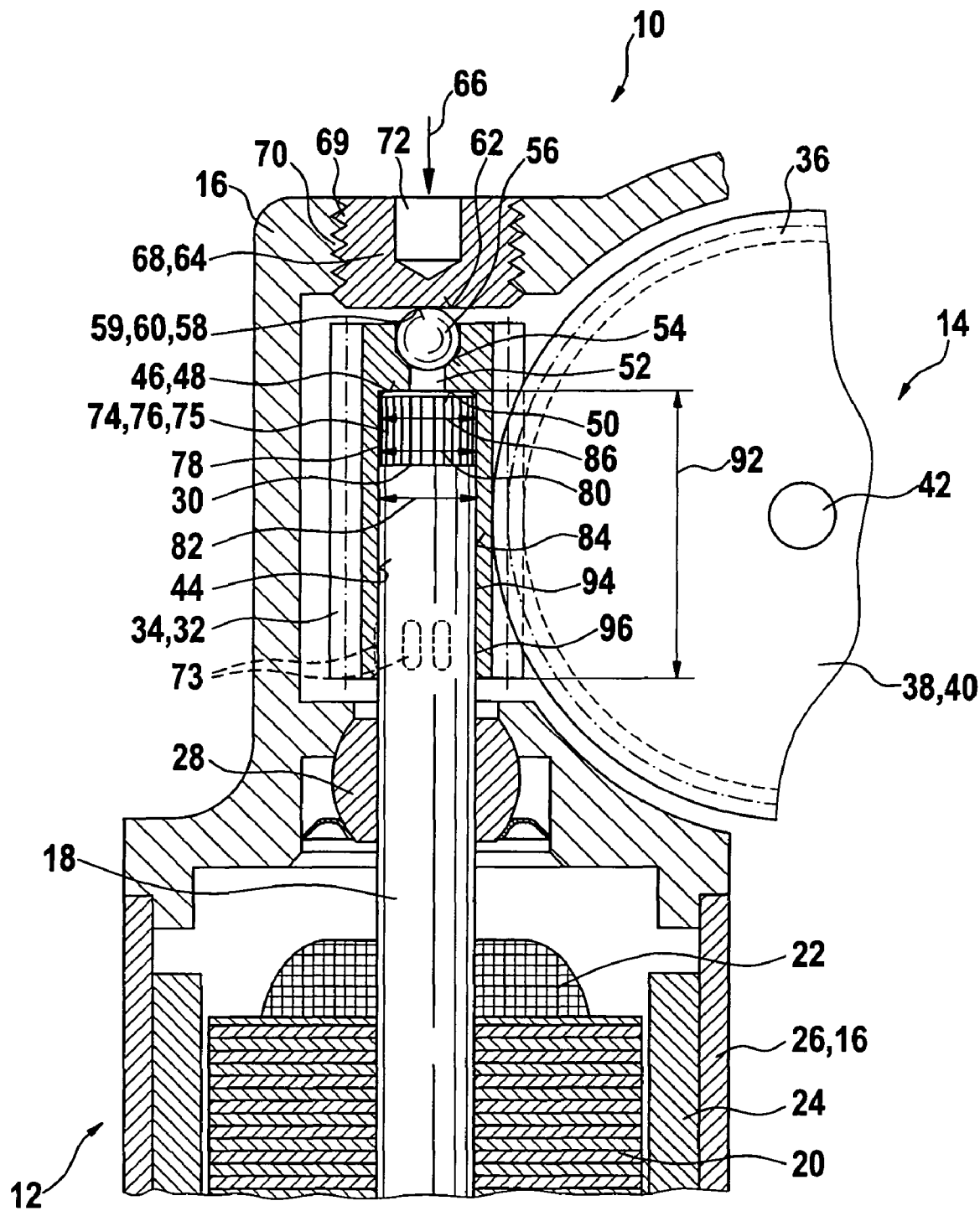

GEAR DRIVE UNIT

BACKGOROUND OF THE INVENTION

The invention relates to a gear drive unit, particularly for adjusting moving parts in the motor vehicle.

One such drive unit has become known from German Utility Model DE 297 02 525 U1; in it, an electric drive motor is operatively connected to a gear located downstream, via an armature shaft. The armature shaft is supported in multiple places in a multi-part housing and extends as far as into the region of the gear. A worm communicating with a worm wheel is pressed onto the armature shaft. On its face ends, the armature shaft is braced on the housing via both run up disks and a damping means.

In such a drive mechanism, used for instance for power windows or for a seat adjuster, forces in both the radial direction and the circumferential direction as well as the axial direction act on the worm. Especially if the part to be adjusted strikes a stop, strong, sudden axial forces act on the worm, and as a result the connection between the armature shaft and the worm pressed onto it may come undone.

SUMMARY OF THE INVENTION

The apparatus of the invention has the advantage that by the embodiment of an axial bearing face on the toothed element supported on the rotor shaft, even strong, sudden axial forces acting on the toothed element can be dissipated to the housing. For this purpose, on the one hand, the toothed element rests with its bearing face on one of the end faces of the rotor shaft, and on the other it is braced axially on the housing in such a way that the connection, in a manner fixed against relative rotation, between the armature shaft and the toothed element needs to divert only the torque acting on the housing. As a result, the form- or force-locking connection between the toothed element and the rotor shaft can be limited to a smaller axial region or to lesser radial deformations, making the assembly of the toothed elements substantially simpler.

In an especially simple and space-saving way, the bearing face can be embodied by a bottom face in a bore. To that end, a central axial blind bore is made in the toothed element, so that a sleevelike part with teeth on the outside is created, which is at least partly closed on one axial end.

For axially bracing the toothed element, its bottom face of the blind bore, embodied as a bearing face, rests on one side on the end face of the rotor shaft, while a bracing face diametrically opposite the bearing face rests on a housing part, or on a bracing element located in that part.

To reduce the friction of the drive unit in operation, and increase its efficiency, the bracing face is especially favorably embodied as a curved face, which is braced virtually at a point on a flat corresponding face structurally connected to the housing. The same effect is attained if such a radius is integrally formed onto the face structurally connected to the housing and the bracing face of the toothed element is correspondingly embodied as flat.

For installing the rotor shaft in the blind bore of the toothed element, it is advantageous to make an opening on the bottom face of the bore, so that the air trapped in the blind bore can escape. This opening can especially advantageously be used for supporting a ball, which forms a curved bracing face with which the toothed element is braced on the housing.

To fix the toothed element on the rotor shaft in a manner that is fixed against relative rotation, radial bumps are integrally formed onto the armature shaft by means of material deformation; they have a larger outside diameter than the corresponding inside diameter of the bore. Depending on the combination of materials between the rotor shaft and the toothed element, when the toothed element is pressed on either a force-locking or a form-locking connection, or a combination of the two, is created.

Because this connection fixed against relative rotation need not absorb any axial forces, the radial bumps can be embodied such that the installation forces involved in pressing the toothed element on can be reduced.

This kind of reduction in the installation forces is attained for instance by providing that the radial bumps are integrally formed only onto the end of the rotor shaft, and the corresponding diameter of the bore in this axial region is less than over the remaining length of the bore.

In such an embodiment of the connection fixed against relative rotation, the rotor shaft can be through-ground economically over its entire length, so that via the radial bumps, a bearing can be thrust onto it onto a bearing seat of the rotor shaft. The radial bumps are embodied here for instance as knurling, which is surface-ground along with the shaft and then press-fitted into the region of the bore having the smaller diameter.

If the connection between the rotor shaft and the bore of the toothed element is embodied as a press fit over only a fraction of its length, then as a result, the press-fitting forces necessary for installation can be reduced markedly. The remainder of the bore is advantageously embodied as a clearance fit, and this region serves to center the toothed element.

For use in a worm gear, a fastening of the toothed element is especially suitable where the toothed element embodied as a worm meshes with a worm wheel. The pressing-on forces necessary for installing the sleevelike worm can then be reduced significantly. However, the connection is also suitable for embodying the toothed element as a pinion, with a straight or oblique toothing that meshes with a corresponding toothing, for instance of a driven wheel.

BRIEF DESCRIPTION OF THE DRAWINGS

One exemplary embodiment of an apparatus of the invention is shown in the drawing and described in further detail in the ensuing description:

FIG. 1 shows a fragmentary section through a gear drive unit of the invention.

DETAILED DESCRIPTION OF THE PREFERRED EMBODIMENTS

In FIG. 1, a gear drive unit 10 is shown, having an electric motor and a gear 14 and a multi-part housing 16 surrounding it. The electric motor 12 has an armature packet 20 that is supported on a rotor shaft 18 and has electrical windings 22. These windings cooperate with magnets 24, which are located in a housing part 16 embodied as a pole cup 26. The rotor shaft 18 is supported here by means of slide or roller bearings 28 in the housing 16 and with one end 30, it extends into the region of the gear 14. A toothed element 32 is located on the rotor shaft 18; in this exemplary embodiment, it is embodied as a worm 34. The toothed element 32 meshes with a toothing 36 of a gear element 38, which is embodied here as a worm wheel 40 and is supported on a bolt 42 structurally connected to the housing. The gear element 38 is connected to a movable final control element, not shown in detail, which for instance adjusts seats in the motor vehicle. The toothed element 32 is manufactured as a separate component and has a central bore 44, which is embodied as a blind bore. On the lower end of the bore 44, there is a bottom face 46, which is embodied as an axial bearing face 48 and rests on one face end 50 of the rotor shaft 18. A through opening 52 is located on the bottom face 46, and through it, air can escape to the surroundings during the installation of the toothed element 32 on the rotor shaft 18. The through opening 52 is embodied here simultaneously as a receptacle 54 for a ball-like bearing element 56, whose spherical surface 58 forms an axial bracing face 60 of the toothed element 32, with a radius 59. The rotor shaft 18 is braced via its face end 50 on the axial bearing face 48 of the toothed element 32. The toothed element 32 is in turn braced, via its axial bracing face 60, on a counterpart face 62 of the housing 16 via the ball 56 supported in the receptacle 54. On the diametrically opposed end, not shown, of the rotor shaft 18, the rotor shaft is likewise supported on a counterpart face 62 structurally connected to the housing. To eliminate the axial play of the rotor shaft 18, at least one of the counterpart faces 62 is located on an adjusting element 64, which presses with a predeterminable pressing force 66 against the axial bracing face 60. To that end, the adjusting element 64 is embodied for instance as an adjusting screw 68, with a thread 69, or as a bracing element 64 with flat radial ribs that is screwed into a wall 70 of the housing 16. To that end, the adjusting element 64 has a form lock 72, which a suitable installation tool can engage from the inside.

For transmitting the torque between the rotor shaft 18 and the toothed element 32, radial bumps 74 are embodied on the end 30 of the rotor shaft 18, for instance in the form of an axially oriented knurling 75 or as a serration 76. In the portion 78 of the rotor shaft 18 having the radial bump 74, the rotor shaft 18 has a diameter 80 which is no greater than over the remaining region 84 of the rotor shaft 18 without a radial bump 74. The rotor shaft 18 is through-ground, so that it can be installed through the bearing 28 into the gear 14. For generating a press fit, the bore 44, in the region of the portion 78 with the corresponding radial bumps 74, has a diameter 86 that is less than its diameter 82 over the remaining axial region 84. The ratio of the diameter 80 of the rotor shaft 18 to the diameter 82 of the bore 44 in the region 84 without radial bumps is embodied as a clearance fit. As a result, over the great majority of the length 92 of the bore, the rotor shaft 18 can be inserted without major expenditure of force. Only for the final portion 78 does a corresponding installation force have to be brought to bear to press the radial bumps 74 in.

If the material of the radial bump 74 is harder than the material of the wall 94 of the bore, then the radial bump 74 digs into the wall 94 and creates a form lock. If the radial bumps 74 are not embodied as hard, a force-locking press fit is the result. For instance, the rotor shaft 18 with the bumps 74 is made of steel, and the toothed element 32 with the wall 94 of the bore 44 is likewise made from steel or from a softer metal, such as brass.

In operation of the drive unit 10, the torque is thus transmitted via the connection fixed against relative rotation of the radial bumps 74; the axial forces that occur are conversely dissipated to the housing 16 via the bearing face 48 and the axial bracing face 60.

In an alternative version, there are no radial bumps 74 on the end 30 of the rotor shaft 18 adjacent to the end face 60. Instead, in a region 96 of the open end of the bore 44 (in the installed state), the rotor shaft 18 has radial bumps 73, shown in dashed lines in FIG. 1. In this version, the radial bumps 73 are not integrally formed onto the rotor shaft 18 until after this shaft has been installed through the bearing sleeve 28. By means of embossing or stamping, for instance, radial bumps 73 which have a larger diameter than the diameter 80 of the remaining region 84 of the rotor shaft are integrally formed. In this version, the bore 44 has a constant diameter 82 over its entire length 92. Upon installation of the toothed element 32, the rotor shaft 18 slides over the great majority of the length 92 as a clearance fit, and only in the final portion 96 of the radially protruding bumps (73) is an increased installation force necessary for producing a press fit.

In a further version not shown, the rotor shaft 18 has radial bumps 73, 74 which are inserted in form-locking fashion into previously formed-on, corresponding counterpart bumps in the wall 94 of the bore 44.

It should be noted that in the exemplary embodiments shown in FIG. 1 and described in this description, many possible combinations with one another are possible. In particular, the shape, location and manufacture of the radial bump 73, 74 can be varied and adapted to the torques to be transmitted. The specific design of the bearing face 48 and the axial bracing face 60 along with the corresponding counterpart face 62 is not limited to the version shown, either. For instance, the axial bracing face 60 may also be embodied as a flat face, which is braced on a curved counterpart face 62 of the adjusting element 64 or of the housing 16. The spherical surface 58 can also be embodied in one piece with the toothed element 32; its toothing. The gear drive unit 10 of the invention is preferably used for adjusting moving parts in the kg, especially seat parts, but is not limited to such an application.

The invention claimed is:

1. A gear drive unit (10) for adjusting moving parts in a motor vehicle, comprising:
   a rotor shaft (18), which is supported in a housing (16) and is braced axially on the housing (16) via at least one face end (50); and
   a separate toothed element (32) for transmitting torque to a gear component (38, 40), wherein said toothed element (32) has a worm gear (34) and is secured to the rotor shaft (18), wherein the toothed element (32) has an axial bearing face (48), which rests on the at least one face end (50) of the rotor shaft (18), wherein the toothed element (32) further has an axial bracing face (60), wherein said toothed element is braced on an adjusting element (64) on the housing (16), wherein said adjusting element (64) has a form lock (72) that is configured to be engaged from the inside of said adjusting element by a selected installation tool, wherein said adjusting element (64) presses with a predeterminable pressing force against the axial bracing face (60) wherein the axial bearing face (48) is located on a bottom face (46) of a bore (44) in the toothed element (32), wherein a through opening (52) is integrally formed onto the bottom face (46) of the bore (44) and receives a ball (56) that has the bracing face (60).

2. The gear drive unit (10) as defined by claim 1, wherein the axial bracing face (60) has a radius (59) and is embodied as a spherical surface (58).

3. The gear drive unit (10) as defined by claim 1, wherein the rotor shaft (18) has a radial bump (74) in the form of a knurling (75) or a serration (76) in an axial portion (78), wherein said radial bump, upon introduction into the bore (44) of the toothed element (32), forms a force- and/or form-locking connection that is fixed against relative rotation.

4. The gear drive unit (10) as defined by claim 3, wherein in the axial region (78) of the radial bump (74) of the rotor shaft (18) at the end next to the bottom face (46), the bore (44) has a lesser inside diameter (86) than in regions (84) of the rotor shaft (18) that are without radial bumps.

5. The gear drive unit (10) as defined by claim 3, wherein the rotor shaft (18), after an integral forming on of the radial bump (74), is through-ground, and is axially mountable through a bearing sleeve (28) in the housing (16).

6. The gear drive unit (10) as defined by claim 3, wherein the rotor shaft (18) is connected to the toothed element (32) in a region (78, 96) having the radial bump (74, 73) via a press fit, and in a region (84) without radial bumps, the rotor shaft (18) is connected to the toothed element (32) via a clearance fit.

7. A gear drive unit (10) for adjusting moving parts in the motor vehicle, comprising:
   a rotor shaft (18), which is supported in a housing (16) and is braced axially on the housing (16) via at least one face end (50); and
   a separate toothed element (32) formed as a worm gear (34) for transmitting torque to a gear component (38, 40), wherein said toothed element (32) is secured to the rotor shaft (18), wherein the toothed element (32) has an axial bearing face (48), which rests on one of the face ends (50) of the rotor shaft (18), wherein a through opening (52) is integrally formed onto a bottom face (46) of a bore (44) and receives a ball (56) that has a bracing face (60), wherein said through opening (52) is configured to receive said ball (56) such that said ball (56) is axially accommodated over half of its diameter in said through opening (52).

\* \* \* \* \*